April 17, 1934.  M. METAL  1,955,593

SPRING PRESSED CLOSURE CAP

Filed Jan. 21, 1932

INVENTOR
Max Metal
BY
ATTORNEY

Patented Apr. 17, 1934

1,955,593

UNITED STATES PATENT OFFICE 1,955,593

SPRING-PRESSED CLOSURE CAP

Max Metal, Detroit, Mich.

Application January 21, 1932, Serial No. 587,902

3 Claims. (Cl. 220—24)

My invention relates to a spring-pressed closure cap and more particularly to such a cap adapted for use in connection with automobile radiators, gas tanks, and the like.

It is an object of my present invention to provide a spring-pressed closure cap particularly adapted for use in connection with automobile radiators, gas tanks, and the like, which is securely closed at all times to prevent leakage of the contents from the said radiator, gas tank, or the like.

It is a further object of my present invention to provide a spring-pressed closure cap particularly adapted for use in connection with automobile radiators, gas tanks, or the like, which permits a filling of the radiator, gas tank, or the like, without removal of the cap, said cap being ornamental in appearance.

These, and various other objects, features of arrangement, construction, and operation, are plainly shown and described and will be best understood by reference to the accompanying drawing, in which.

Similar reference numerals refer to similar parts throughout the several views.

Figure 1:
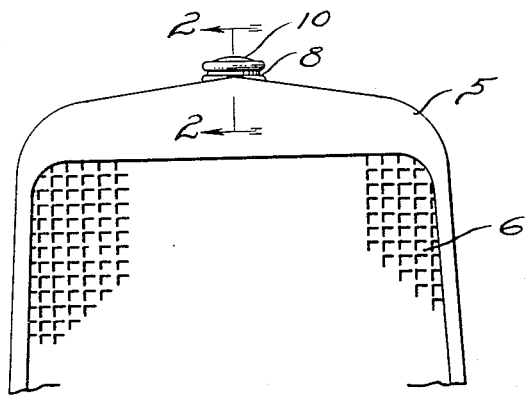
Fig. 1 is a fragmentary view in front elevation of a portion of an automobile radiator on which is placed a closure cap embodying my invention.
Figure 2:
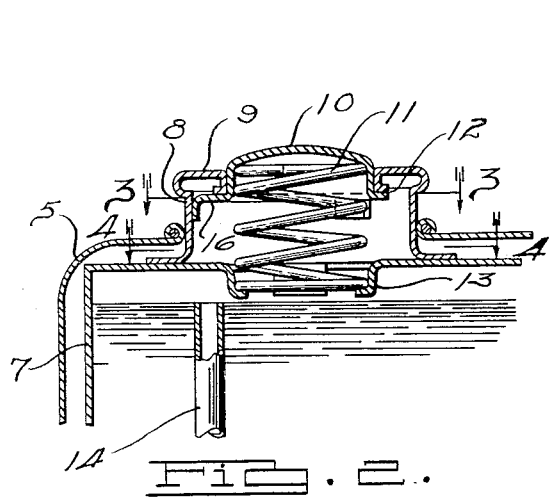
Fig. 2 is a fragmentary view in cross section taken on the line 2—2 of Fig. 1.

Referring more in detail to the drawing, 5 designates the outer ornamental shell of an automobile radiator of any conventional type, and 6 designates a radiator core. Reference numeral 7 designates the reservoir, which is a part of the core 6 of the entire radiator. A filler spout 8 extends above the shell 5 and provides means for filling the reservoir 7 with the cooling medium.

The filling spout 8 is provided with a turned flange portion 9, against which the cap portion 10 is spring-pressed by the spring 11. Between the cap 10 and the inside of the flange 9 a gasket 12 is provided so that spilling of the cooling medium contained in the radiator is prevented. The spring 11 seats on a spring seat 13, which is formed as a part of the top of the reservoir 7. An overflow pipe 14 is provided within the reservoir 7 to accommodate for overflow of the cooling medium.

Figure 3:
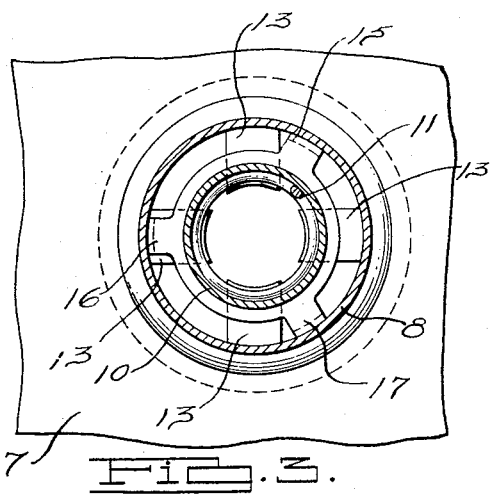
Fig. 3 is a fragmentary sectional view taken on the line 3—3 of Fig. 2.
Figure 4:
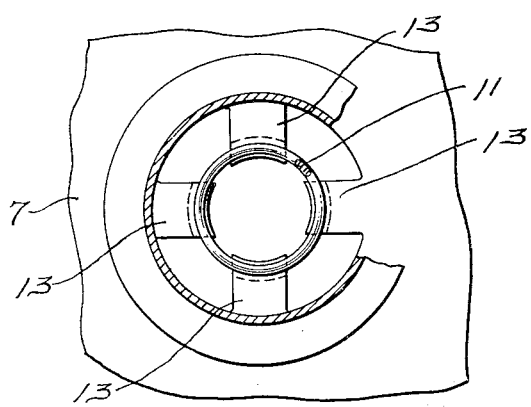
Fig. 4 is a fragmentary sectional view taken on the line 4—4 of Fig. 2.

The operation of my invention is as follows:

When it is desired to fill the radiator, pressure is exerted on the top of the cap 10, which compresses the spring 11 and permits the cap 10 to be pushed downwardly toward the reservoir 7. This unseats the cap 10 from the flange 9 and permits pouring of the cooling medium into the reservoir 7 of the radiator. As shown in Fig. 3, the cap 10 is held in place by three extending portions, 15, 16 and 17, and between these extending portions 15, 16 and 17, openings are provided to permit the cooling medium to flow over and through the cap 10 and into the interior of the filling spout 8. From this point it passes through the openings provided in the spring seat 13, as shown in Fig. 4.

From the foregoing it is apparent that with slight mechanical changes a closure cap embodying my invention may be adapted for use in connection with a gasoline tank, or other fluid container, and I do not desire to be limited to the particular application here shown, which is merely a preferred embodiment of my invention.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A closure cap for automobile radiators including a filling spout having an inturned flange integral therewith, a cap portion having extending edges, and a spring seated upon a spring seat integral with the reservoir of said radiator and contacting with said cap portion for yieldingly holding said cap portion in intimate contact with said flanged portion.

2. A closure cap for automobile radiators including a filling spout having an inturned flange integral therewith, a cap portion having extending edges, a spring seated upon a spring seat integral with the reservoir of said radiator and contacting with said cap portion for yieldingly holding said cap portion in intimate contact with said flanged portion, and flexible sealing means extending around said cap portion between said cap portion and said flanged portion of said filler spout.

3. An automobile radiator including a core, a reservoir, and a filling spout, means integral with said reservoir for supporting a spring, an inturned flange integral with said filling spout, a cap having extending edge portions contained within said flanged portion of said filler spout and surrounded thereby, a spring contacting with the underside of said cap portion and supported by said spring supporting means integral with said reservoir for yieldingly holding said cap in intimate contact with said flanged portion of said filler spout.

MAX METAL.